(12) United States Patent
Wehrmann et al.

(10) Patent No.: US 8,664,349 B2
(45) Date of Patent: Mar. 4, 2014

(54) POLYCARBONATE COMPOSITIONS HAVING IMPROVED OPTICAL PROPERTIES

(75) Inventors: Rolf Wehrmann, Krefeld (DE); Helmut-Werner Heuer, Leverkusen (DE); Anke Boumans, Goch (DE)

(73) Assignee: Bayer MaterialScience AG (DE)

( * ) Notice: Subject to any disclaimer, the term of this patent is extended or adjusted under 35 U.S.C. 154(b) by 41 days.

(21) Appl. No.: 13/499,058

(22) PCT Filed: Sep. 17, 2010

(86) PCT No.: PCT/EP2010/005724
§ 371 (c)(1),
(2), (4) Date: Mar. 29, 2012

(87) PCT Pub. No.: WO2011/038841
PCT Pub. Date: Apr. 7, 2011

(65) Prior Publication Data
US 2012/0190778 A1 Jul. 26, 2012

(30) Foreign Application Priority Data
Sep. 30, 2009 (DE) .......... 10 2009 043 513

(51) Int. Cl.
*C08G 64/00* (2006.01)
*C08G 63/02* (2006.01)

(52) U.S. Cl.
USPC ......... 528/196; 524/91; 524/117; 524/153; 528/198

(58) Field of Classification Search
USPC ......... 524/91, 100, 117, 153; 528/196, 198
See application file for complete search history.

(56) References Cited

U.S. PATENT DOCUMENTS

| | | | |
|---|---|---|---|
| 2,991,273 A | 7/1961 | Hechelhammer et al. | |
| 2,999,835 A | 9/1961 | Goldberg | |
| 2,999,846 A | 9/1961 | Schnell et al. | |
| 3,148,172 A | 9/1964 | Fox | |
| 3,271,367 A | 9/1966 | Schnell et al. | |
| 4,973,652 A | 11/1990 | Ebert et al. | |
| 4,982,014 A | 1/1991 | Freitag et al. | |
| 5,235,026 A | 8/1993 | Wulff et al. | |
| 5,852,138 A | 12/1998 | Meier et al. | |
| 7,332,560 B2 * | 2/2008 | Heuer et al. | 528/196 |
| 2002/0173566 A1 | 11/2002 | Haese et al. | |
| 2005/0288407 A1 | 12/2005 | Heuer et al. | |
| 2006/0135735 A1 | 6/2006 | Meyer et al. | |
| 2007/0060704 A1 | 3/2007 | Rudiger et al. | |

FOREIGN PATENT DOCUMENTS

| | | |
|---|---|---|
| CA | 2374444 A1 | 12/2000 |
| DE | 1570703 A1 | 2/1970 |
| DE | 2036052 A1 | 1/1972 |
| DE | 2 063 050 A1 | 7/1972 |
| DE | 2211956 A1 | 10/1973 |
| DE | 3832396 A1 | 2/1990 |
| EP | 0346761 A2 | 12/1989 |
| EP | 0517044 A2 | 12/1992 |
| EP | 0625521 A2 | 11/1994 |
| EP | 0789053 A1 | 8/1997 |
| EP | 1 609 818 A2 | 12/2005 |
| FR | 1561518 A | 3/1969 |
| GB | 1122003 A | 7/1968 |
| GB | 1229482 A | 4/1971 |
| GB | 1341318 A | 12/1973 |
| GB | 1367790 A | 9/1974 |
| WO | WO-99/55772 A1 | 11/1999 |
| WO | WO-00/73386 A1 | 12/2000 |
| WO | WO-02/077087 A1 | 10/2002 |
| WO | WO-2006/072344 A1 | 7/2006 |
| WO | WO-2007/022863 A1 | 3/2007 |

* cited by examiner

*Primary Examiner* — Terressa Boykin
(74) *Attorney, Agent, or Firm* — Novak Druce Connolly Bove + Quigg LLP

(57) ABSTRACT

The present invention relates to polycarbonate compositions and copolycarbonate compositions having improved optical properties, and to their production and their use for the production of shaped parts, and to shaped parts which can thereby be obtained, the compositions containing a polycarbonate or copolycarbonate which comprises bisphenol-A and at least one pair of a phosphorus compound having the oxidation number +3 and a phosphorus compound having the oxidation number +5, and the phosphorus compound having the oxidation state +5 in a pair respectively corresponding to the oxidized form of the phosphorus compound having the oxidation state +3 and the amount of more highly oxidized compound contained being less than that of the compound with the lower oxidation number.

18 Claims, No Drawings

POLYCARBONATE COMPOSITIONS HAVING IMPROVED OPTICAL PROPERTIES

RELATED APPLICATIONS

This application is a national stage application (under 35 U.S.C. §371) of PCT/EP2010/005724, filed Sep. 17, 2010, which claims benefit of German Patent Application No. 10 2009 043 513.1, filed Sep. 30, 2009.

The present invention relates to polycarbonate compositions and copolycarbonate compositions, for example blends, having improved optical properties, and to their production and their use for the production of shaped parts, and to shaped parts which can thereby be obtained.

Polycarbonates belong to the group of industrial thermoplastics. They have widespread uses in the electrical and electronics sectors, as packaging material for lamps and in applications for which special mechanical properties are required in combination with good optical properties.

Other large fields of use are therefore optical data storage, for example CDs and DVDs, Blue-ray discs and HD-DVDs, extrusion applications for the production of polycarbonate plates, scattering discs and other display applications, optical applications in the automotive sector, for example glazing, plastic coverings, lightguide elements and polymer lightguide fibres and diffusor sheets for background lighting, LED applications, lenses, collimators and lamp coverings for long-field lamps, but also the production of water bottles.

In all these applications, good optical properties are always required in combination with good mechanical properties and rheological properties, for example good flowability, together with high thermal load-bearing capacity, particularly during production or processing.

In continuous methods for producing polycarbonates, for example according to the phase interface method or melt polycondensation method, the polycarbonate melts are exposed to strong thermal stress and high shear energy in the processing units, so that damage can already occur here in the polymer, manifested by a degradation of the optical properties, often in the form of reduced transmission and an increased yellowness index.

EP0789053 A1 describes mixtures of phosphines and silicon compounds for the long-term stabilisation of polycarbonates, although no mixtures are described for stabilising the composition during processing.

WO 00/73386 describes polycarbonate moulding compositions for the production of articles with reduced dust accumulation, in which antioxidants from the group consisting of phosphines, diphosphonites, hydroxyphenyl propionates and other commercial phosphorus compounds are used. The problem of stabilising the optical properties of compositions and the use of phosphine/phosphine oxide mixtures, however, are neither mentioned nor described.

In EP 0625521 A1, bisphosphine oxide dihydroxyaryl monomers are used as monomer components for polycarbonates, in order to obtain polycarbonates with a high glass transition temperature, high impact strength and good flame retardancy.

EP 0346761 B1 describes a method for producing polycarbonates according to the phase interface method with the aid of phosphines or phosphine oxides as process catalysts in polycondensation, the catalysts being removed from the polymer during processing.

None of these documents which characterise the prior art, however, gives an indication of how the optical properties of polycarbonate compositions can be improved while maintaining good mechanical properties, even though there is a need for optically outstanding compositions in the fields of use mentioned above.

It was therefore an object of the present invention to develop aromatic polycarbonate compositions and polycarbonate compositions having improved optical properties while maintaining good rheological properties. For these compositions, in particular, the yellowness index is intended to be lowered and the transmission increased.

Surprisingly, it has been found that mixtures of phosphorus compounds in oxidation states +3 and +5 produced in situ, or which are added to the polycarbonate compositions, impart an improved optical property profile with constant rheological properties to the compositions produced in a continuous polycarbonate production process according to the phase interface method or melt polycondensation.

Both in situ produced and added pairs of phosphorus compounds of Formulae (1) to (6) in oxidation states +3 and +5, which are introduced as additives during production, reduce the yellowness index and increase the transmission of the polycarbonate compositions. Here, a phosphorus compound pair is intended to mean compounds with oxidation states +3 and +5, the compound with oxidation state +5 being the oxidation product of the compound with oxidation state +3.

The present invention therefore provides polycarbonate compositions containing pairs of phosphorus compounds of Formulae (1) and (2) or (3) and (4) or (5) and (6) or mixtures of at least two pairs of these formulae.

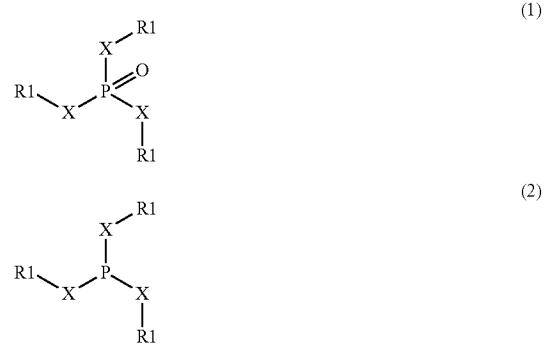

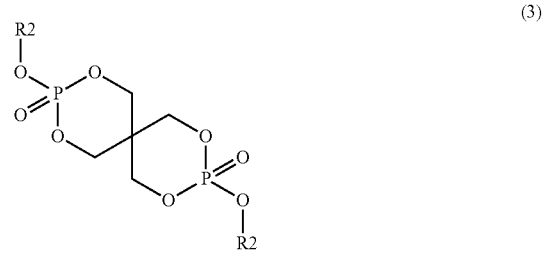

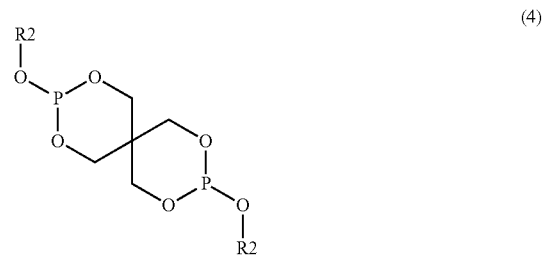

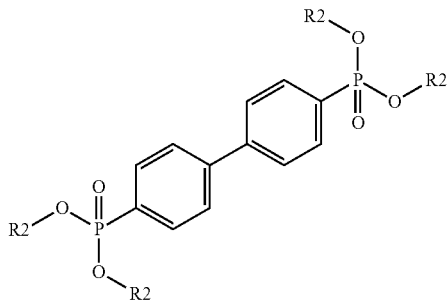

(5)

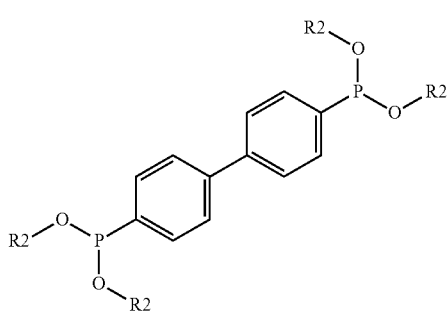

(6)

where X can stand for a single chemical bond or for an oxygen atom,
and R1 and R2 independently of one another can stand for a phenyl radical or a substituted phenyl. The phenyl radical is preferably substituted with $C_1$-$C_8$ alkyl, branched $C_1$-$C_8$ alkyl or cumyl, in which case the substituents may be identical or different, although identical substituents are preferred.

The phenyl radicals are preferably substituted in positions 2 and 4 or 2, 4 and 6.

Tert-butyl substituents in these positions are more particularly preferred.

The phenyl radical may carry at most 5 substituents, with one, two or three substituents being preferred and two or three substituents particularly preferred.

Furthermore, identically named radicals R in a compound may be different within the scope of the definitions given, although identical radicals are preferred.

In a preferred embodiment, the compound (1), (3) or (5) is produced in situ in a continuous process in which the corresponding compound (2), (4) or (6) is added to a polycarbonate melt by means of a side unit, preferably with the exclusion of air, and the compounds (1), (3) or (5) are formed in an in situ reaction inside the production units, the concentration of compound (2), (4) or (6) in the polycarbonate granules subsequently isolated being more than that of the compound (1), (3) or (5).

The transition from oxidation number +3 to +5 may also take place stepwise in the phosphorus compounds (4) and (6), i.e. first one of the two phosphorus atoms with oxidation number +3 is oxidised so that there may be phosphorus compounds which have both an oxidation number +3 and an oxidation number +5, in which case the two phosphorus groups must be considered separately from one another.

The amount of compounds of Formulae (2), (4) or (6) contained in the composition is preferably from 5 to 1500 ppm, preferentially 10 to 1200 ppm, more preferably 30 to 1000 ppm, even more preferably 50 to 800 ppm, particularly preferably 80 to 400 ppm and most preferably 100 to 325 ppm.

The amount of compounds of Formulae (1), (3) or (5) contained in the composition is preferably from 5 to 300 ppm, preferentially 10 to 200 ppm, more preferably 15 to 100 ppm, and particularly preferably 20 to 60 ppm.

The amount of compounds according to one of Formulae (1), (3) or (5) is from 2% to 49%, preferably 2% to 45%, particularly preferably 3% to 40% more particularly preferably 4% to 35%, expressed in terms of the total mass of the compounds of Formulae (1)-(6).

In an alternative embodiment, the corresponding compounds with the oxidation states +3 and +5 are added to the polycarbonate melt, the proportion of compounds with oxidation state +3 being more than the proportion of compounds with oxidation state +5.

Polycarbonate compositions containing pairs of Formulae (7) and (8) or (9) and (10) or (11) and (12) or (13) and (14), which are derived from Formulae (1)-(6), are particularly preferred

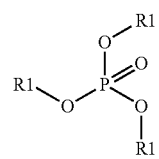

(7)

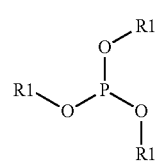

(8)

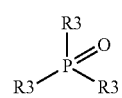

(9)

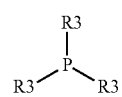

(10)

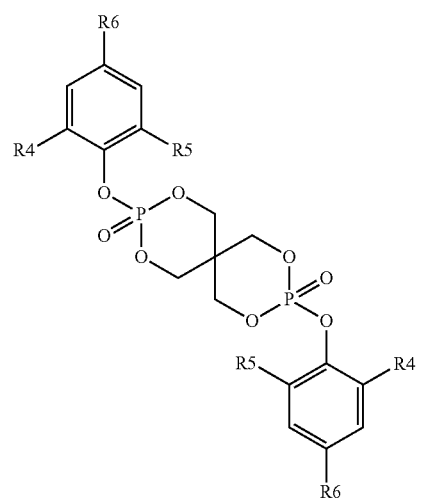

(11)

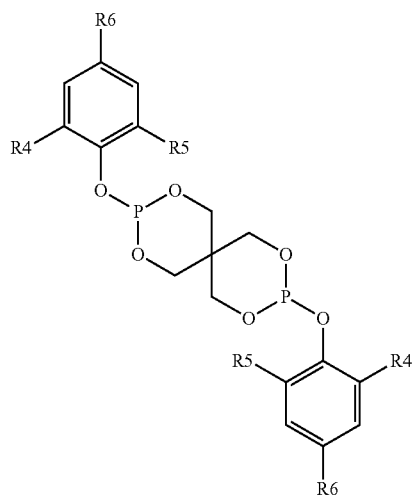
(12)

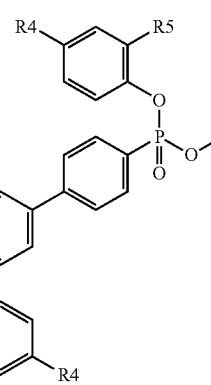
(13)

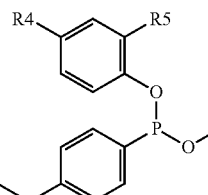

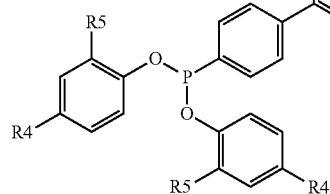
(14)

where R1 and R3 independently of one another can stand for a phenyl radical or a substituted phenyl radical. The phenyl radical is preferably substituted with $C_1$-$C_8$ alkyl, branched $C_1$-$C_8$ alkyl or cumyl, in which case the substituents may be identical or different, although identical substituents are preferred,
and R4, R5 and R6 stand for H, branched $C_1$-$C_8$ alkyl or cumyl, preferably tert-butyl or cumyl.

The compounds (7), (9), (11) and (13) are preferably produced as described above in situ in a continuous process in which the compound (8), (10), (12) or (14) is added to a polycarbonate melt by means of a side unit, preferably with the exclusion of air, and the compounds (7), (9), (11) and (13) are formed in an in situ reaction inside the production units, the concentration of the compounds (7), (9), (11) and (13) in the polycarbonate granules subsequently isolated being less than that of the compounds (8), (10), (12) or (14).

As an alternative, however, pairs of these compounds or mixtures of pairs may also be added.

Polycarbonate compositions containing pairs of Formulae (15) and (16) or (17) and (18) or (19) and (20) or (21) and (22), and mixtures of these pairs, are furthermore particularly preferred.

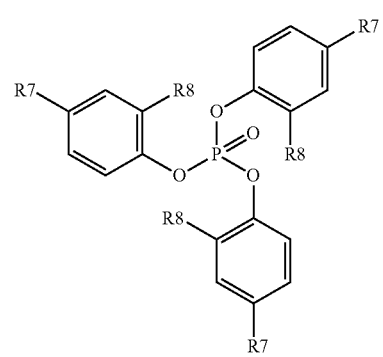
(15)

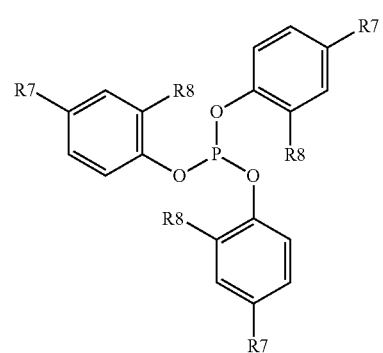
(16)

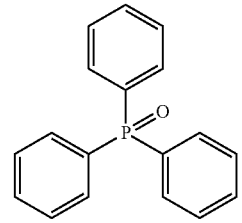
(17)

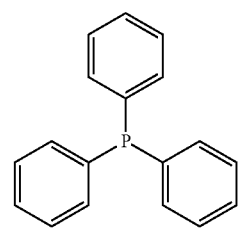
(18)

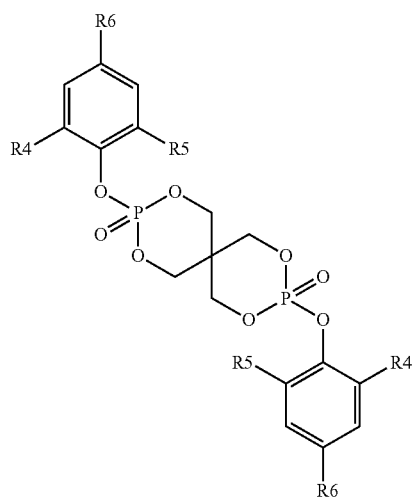
(19)

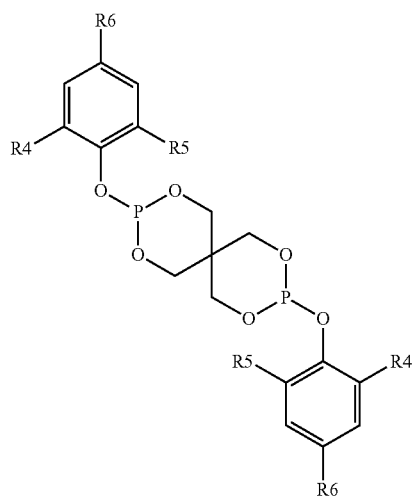
(20)

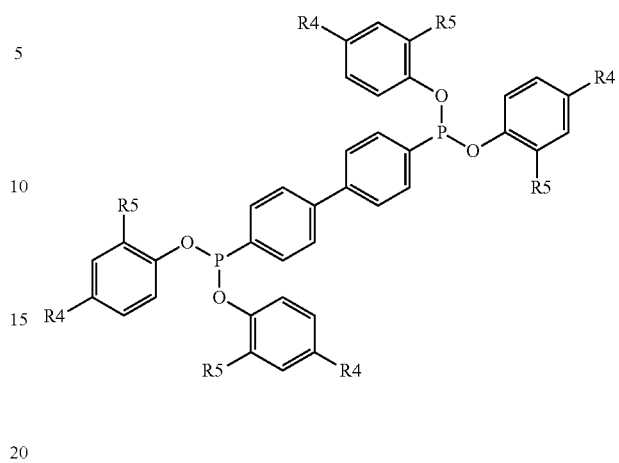
(22)

where R4, R5, R6, R7 and R8 stand for H, branched $C_1$-$C_8$ alkyl or cumyl, preferably tert-butyl or cumyl.

As above, the compounds (15), (17), (19) and (21) are preferably produced in situ in a continuous process in which the compound (16), (18), (20) and (22) is added to a polycarbonate melt by means of a side unit with the exclusion of air, and the compounds (15), (17), (19) and (21) are formed in an in situ reaction inside the production units, the concentration of (15), (17), (19) and (21) in the polycarbonate granules subsequently isolated being less than those of compounds (16), (18), (20) and (22).

As an alternative, however, pairs of these compounds or mixtures of pairs may also be added.

Polycarbonate compositions containing mixtures of Formulae (23) and (24) or (17) and (18) or (25) and (26) or (27) and (28) and mixtures of these pairs are furthermore more particularly preferred, a mixture of Formulae 17 and 18 being most preferred.

(21)

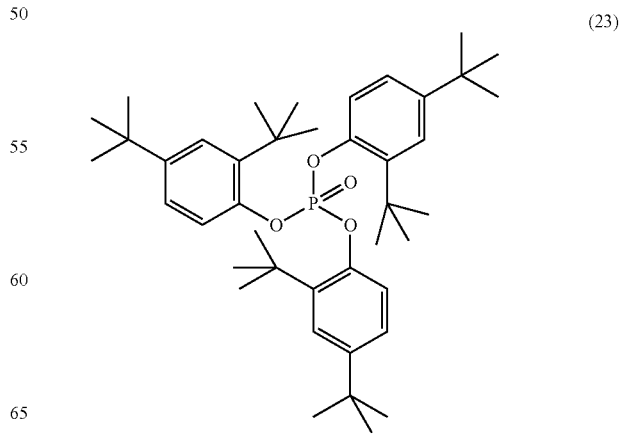
(23)

(24)

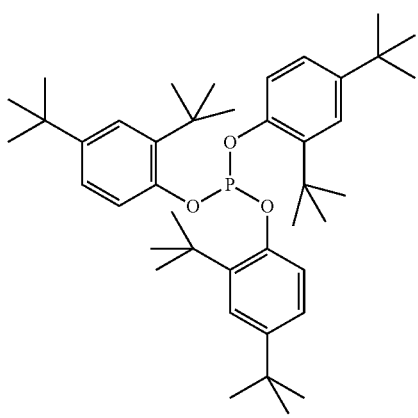

(26)

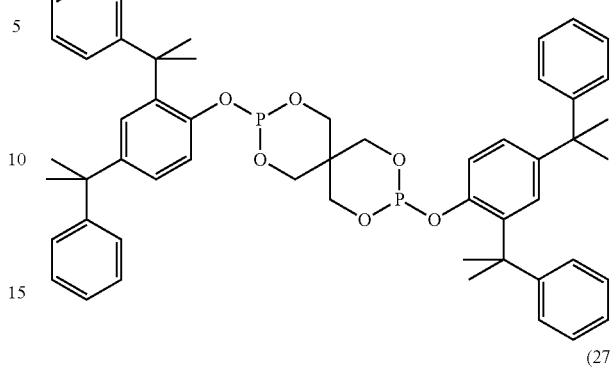

(17)

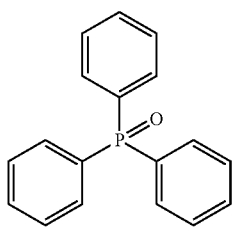

(27)

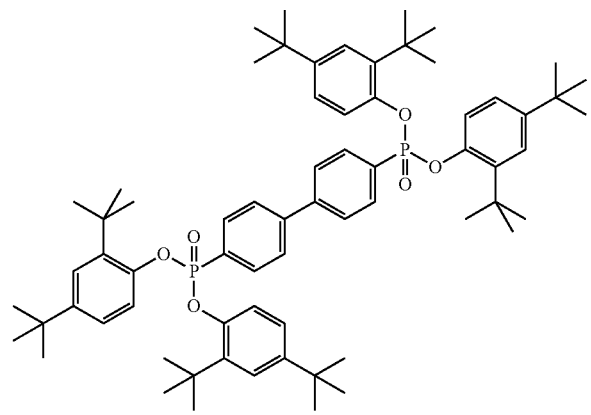

(18)

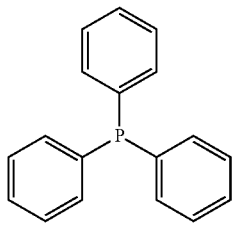

(28)

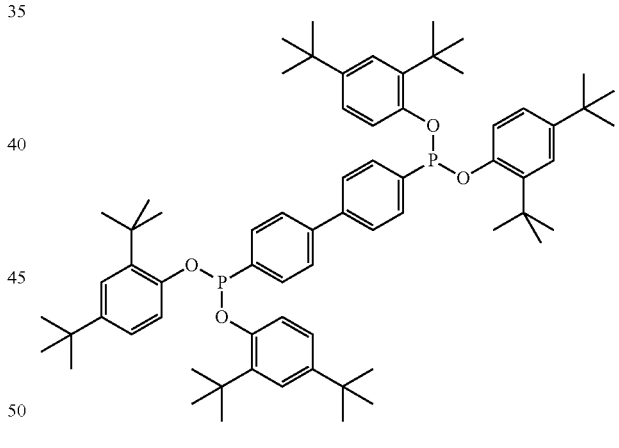

(25)

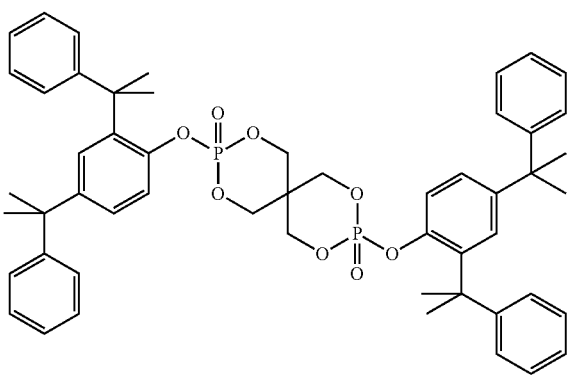

These compounds may also be produced as described above and/or introduced by addition.

Compounds having structural elements of Formulae (1) to (28) are referred to as secondary antioxidants (hydroperoxide decomposers) or consecutive products thereof (Plastics Additives Handbook, 5th Edition, Hanser Verlag Munich, 2001).

Further primary antioxidants (for example radical scavengers), such as sterically hindered phenols or HALS stabilisers, may optionally also be added to the compositions according to the invention (Plastics Additives Handbook, 5th Edition, Hanser Verlag Munich, 2001).

The ratio of secondary to primary antioxidants may lie between 6:1 and 1:6, preferably between 5:1 and 1:5, particularly preferably between 4:1 and 1:4, and more particularly preferably between 3:1 and 1:3.

Thermoplastic aromatic polycarbonates in the context of the present invention are both homopolycarbonates and copolycarbonates; the polycarbonates may in the known way be linear or branched.

Thermoplastic polycarbonates and copolycarbonates, including thermoplastic aromatic polycarbonates, both covered by the term polycarbonate, have molecular weights $M_w$ (weight average Mw, determined by gel permeation chromatography (GPC) measurement, polycarbonate calibration) of from 10,000 to 200,000, preferably from 15,000 to 100,000 and particularly preferably 17,000-70,000 g/mol.

The compositions of the present invention may furthermore contain at least one additive selected from the group consisting of UV stabilisers and mould release agents, and optionally colorants.

10

The proportion of these additives in the composition is generally from 0.001 to 1.000, preferably 0.005 to 0.800, particularly preferably 0.04 to 0.50 wt % (expressed in terms of the total composition).

Organic UV stabilisers are suitable as UV stabilisers. The UV stabilisers are preferably selected from the group which comprises benzotriazoles (for example Tinuvins from the company Ciba, Triazine CGX-06 from the company Ciba), benzophenones (Uvinuls from the company BASF), cyanacrylates (Uvinuls from the company BASF), cinnamic acid esters and oxalanilides, and mixtures of these UV stabilisers.

Examples of suitable UV absorbers are:

a) Malonic esters of Formula (I):

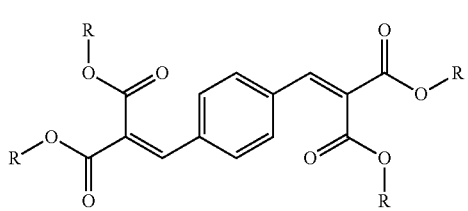

wherein R denotes alkyl. R preferably stands for C1-C6 alkyl, in particular for C1-C4 alkyl and particularly preferably for ethyl.

b) Benzotriazole derivates according to Formula (II):

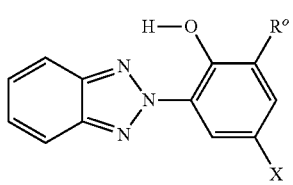

In Formula (II), $R^o$ and X are identical or different and denote H or alkyl or alkylaryl.

Tinuvin® 329 with X=1,1,3,3-tetramethylbutyl and $R^o$=H, Tinuvin® 350 with X=tert-butyl and R0=2-butyl and Tinuvin® 234 with X and $R^o$=1,1-dimethyl-1-phenyl are preferred.

c) Dimeric benzotriazole derivates according to Formula (III):

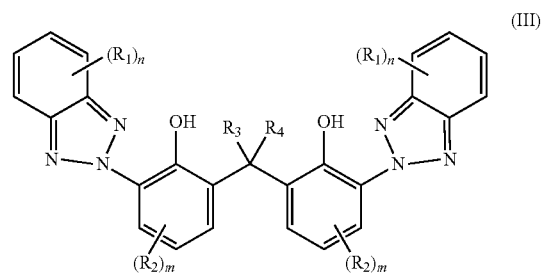

In Formula (III), R1 and R2 are identical or different and denote H, halogen, C1-C10 alkyl, C5-C10 cycloalkyl, C7-C13 aralkyl, C6-C14 aryl, —OR5 or —(CO)—O—R 5 with R5=H or C1-C4 alkyl.

In Formula (III), R3 and R4 are likewise identical or different and denote H, C1-C4 alkyl, C5-C6 cycloalkyl, benzyl or C6-C14 aryl.

In Formula (III) m denotes 1, 2 or 3 and n denotes 1, 2, 3 or 4.

Tinuvin® 360 with R1=R3=R4=H; n=4; R2=1,1,3,3-tetramethylbutyl; m=1 is preferred.

d) Dimeric benzotriazole derivates according to Formula (IV):

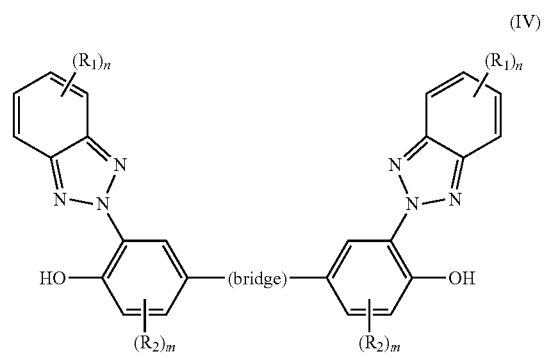

wherein the bridge denotes

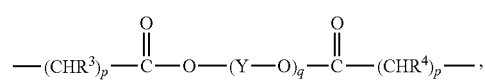

R1, R2, m and n have the meaning mentioned for Formula (III), and wherein p is an integer from 0 to 3, q is an integer from 1 to 10, Y is —CH2-CH2-, —(CH2)3-, —(CH2)4-, —(CH2)5-, —(CH2)6-, or CH(CH3)-CH2, and R3 and R4 have the meaning mentioned for Formula (III).

Tinuvin® 840 with R1=H; n=4; R2=tert-butyl; m=1; R2 is attached to the OH group in the ortho position; R3=R4=H; p=2; Y=—(CH2)5-; q=1 is preferred.

e) Triazine derivates according to Formula (V):

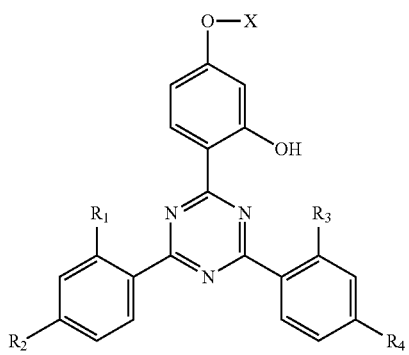

wherein R1, R2, R3, R4 are identical or different and are H, alkyl, aryl, CN or halogen, and X is alkyl, preferably iso-octyl.

Tinuvin® 1577 with R1=R2=R3=R4=H; X=hexyl and Cyasorb® UV-1 164 with R1=R2=R3=R4=methyl; X octyl are preferred.

f) Triazine derivates according to the following formula (Va):

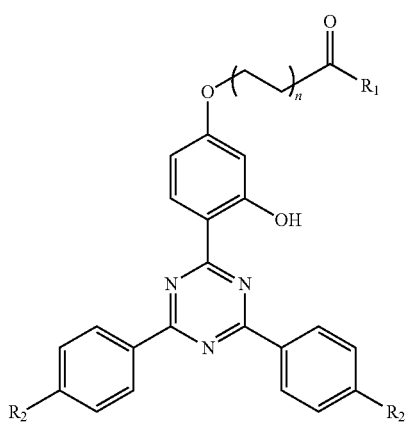

wherein R1 denotes C1 alkyl to C17 alkyl, R2 denotes H or C1 alkyl to C4 alkyl and n is from 0 to 20.

g) Dimeric triazine derivatives of Formula (VI):

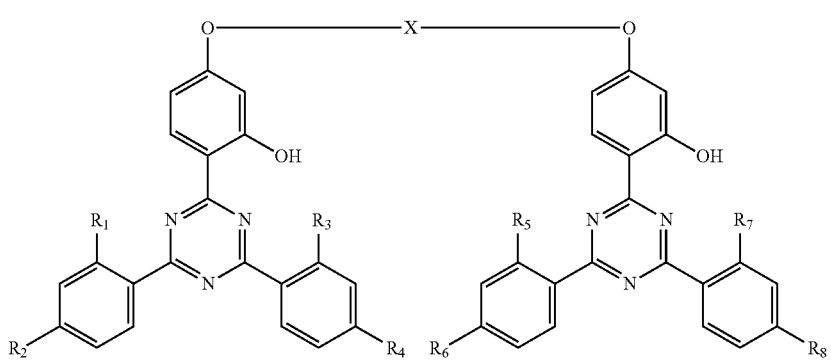

wherein R1, R2, R3, R4, R5, R6, R7, R8 may be identical or different, and denote H, alkyl, CN or halogen and X is alkylidene, preferably methylidene or —(CH2 CH2-O-)n-C(=O)— and n is from 1 to 10, preferably 1 to 5, in particular 1 to 3.

h) Diarylcyanoacrylates Formula (VII):

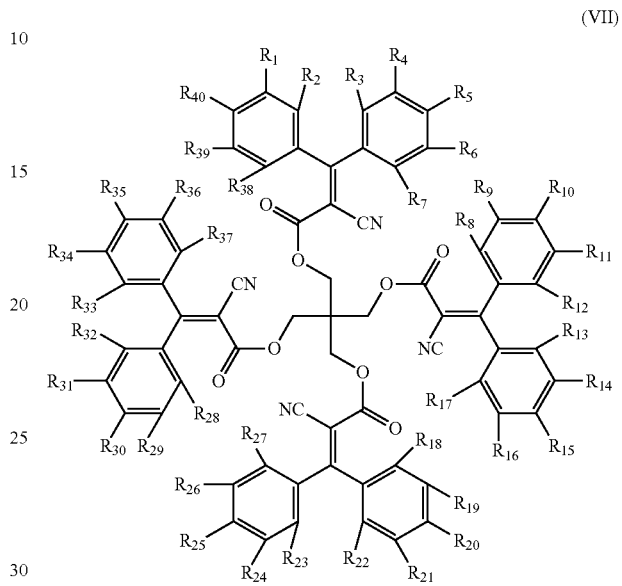

wherein R1 to R40 may be identical or different, and denote H, alkyl, CN or halogen.

Uvinul® 3030 with R1 to R40=H is preferred.

Particularly preferred UV stabilisers for the moulding compositions according to the invention are compounds from the group which consists of the benzotriazoles (b) and dimeric benzotriazoles (c and d), the malonic esters (a) and the cyanacrylates (h) and mixtures of these compounds.

The UV stabilisers are used in amounts of from 0.01 wt % to 15.00 wt % expressed in terms of the moulding composition, preferably in amounts of from 0.05 wt % to 1.00 wt %, particularly preferably in amounts of from 0.08 wt % to 0.5 wt % and more particularly preferably in amounts of from 0.1 wt % to 0.4 wt % expressed in terms of the moulding composition.

The mould release agents optionally added to the compositions according to the invention are preferably selected from the group which comprises pentaerythritol tetrastearate, glycerine monostearate, stearyl stearate and propanediol stearate and mixtures thereof The mould release agents are used in amounts of from 0.05 wt % to 2.00 wt % expressed in terms of the moulding composition, preferably in amounts of from 0.1 wt % to 1.0 wt %, particularly preferably in amounts of from 0.15 wt % to 0.60 wt % and more particularly preferably in amounts of from 0.2 wt % to 0.5 wt % expressed in terms of the total composition.

As primary antioxidants, sterically hindered phenols (for example Irganox types from the company Ciba, for example Irganox 1076 (octadecyl-3-(3,5-di-tert.butyl-4-hydroxyphenyl)-propionate), Irganox 1010 (pentaerythritol-tetrakis(3-(3,5-di-tert.butyl-4-hydroxyphenyl)-propionate) or Irganox 1035 (thiodiethylene bis (3-(3,5-di-tert.butyl-4-hydroxyphenyl)-propionate)) are preferably used.

The compositions according to the invention may furthermore contain conventional additives such as other thermal stabilisers, antistatics, colorants, flow assisters and flameproofing agents.

The production of the polycarbonates to be used according to the invention is carried out in principle in the known way from diphenols, carbonic acid derivatives and optionally branchers.

Methods for polycarbonate synthesis are widely known and described in numerous publications. EP-A 0 517 044, WO 2006/072344, EP-A 1 609 818, WO 2006/072344 and EP-A 1 609 818 and documents cited therein described, for example, the phase interface and melt methods for producing polycarbonate.

Dihydroxyaryl compounds suitable for the production of polycarbonates are those of Formula (29)

HO—Z—OH  (29)

in which

Z is an aromatic radical having from 6 to 30 C atoms, which may contain one or more aromatic rings, may be substituted and may contain aliphatic or cycloaliphatic radicals, or alkylaryls or heteroatoms as bridging components.

Z in Formula (29) preferably stands for a radical of Formula (30)

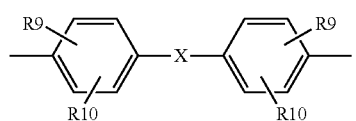

in which $R^9$ and $R^{10}$ independently of one another stand for H, $C_1$-$C_{18}$ alkyl, $C_1$-$C_{18}$ alkoxy, halogen such as Cl or Br or for respectively optionally substituted aryl- or aralkyl, preferably for H or $C_1$-$C_{12}$ alkyl, particularly preferably for H or $C_1$-$C_8$ alkyl and more particularly preferably for H or methyl, and X (Formula 30) stands for a single bond, —$SO_2$—, —CO—, —O—, —S—, $C_1$ to $C_6$ alkylene, $C_2$ to $C_5$ alkylidene or for $C_6$ to $C_{12}$ arylene, which may optionally be condensed with aromatic rings furthermore containing other heteroatoms.

X preferably stands for a single bond, $C_1$ to $C_5$ alkylene, $C_2$ to $C_5$ alkylidene, C5 to C12 cycloalkylidene, —O—, —SO—, —CO—, —S—, —$SO_2$—; X particularly preferably stands for a single bond, isopropylidene, C5 to C12 cycloalkylidene or oxygen.

Diphenols suitable for the production of polycarbonates to be used according to the invention are for example hydroquinone, resorcin, dihydroxydiphenyl, bis-(hydroxyphenyl)-alkanes, bis(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, α,α'-bis-(hydroxyphenyl)-diisopropylbenzoles, and alkylated, ring-alkylated and ring-halogenated compounds thereof.

Preferred diphenols are 4,4'-dihydroxydiphenyl, 2,2-bis-(4-hydroxyphenyl)-1-phenyl-propane, 1,1-bis-(4-hydroxyphenyl)-phenyl-ethane, 2,2-bis-(4-hydroxyphenyl)propane, 2,2-bis-(3-methyl, 4-hydroxyphenyl)-propane, 2,4-bis-(4-hydroxyphenyl)-2-methylbutane, 1,3-bis-[2-(4-hydroxyphenyl)-2-propyl]benzole (bisphenol M), 2,2-bis-(3-methyl-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,3-bis-[2-(3,5-dimethyl-4-hydroxyphenyl)-2-propyl]-benzole, 1,1-bis-(4-hydroxyphenyl)-3,3,5-trimethyl-cyclohexane.

Particularly preferred diphenols are 2,2-bis-(4-hydroxyphenyl)-propane (BPA), 4,4'-dihydroxydiphenyl (DOD) and 2,2-bis-(3-methyl-4-hydroxyphenyl)-propane, 1,1-bis-(4-hydroxyphenyl)-3,3,5-trimethylcyclohexane (TMC).

These and other suitable diphenols are described for example in U.S. Pat. Nos. 2,999,835, 3,148,172, 2,991,273, 3,271,367, 4,982,014 and 2,999,846, in laid-open German patent specifications 1 570 703, 2 063 050, 2 036 052, 2 211 956 and 3 832 396, French patent specification 1 561 518, in the monograph "H. Schnell, Chemistry and Physics of Polycarbonates, Interscience Publishers, New York 1964, pp. 28ff; pp. 102ff", and in "D. G. Legrand, J. T. Bendler, Handbook of Polycarbonate Science and Technology, Marcel Dekker New York 2000, pp. 72ff.".

In the case of homopolycarbonates only one diphenol is used; in the case of copolycarbonates two or more diphenols are used. The diphenols used, as well as any other chemicals and auxiliary substances added to the synthesis, may be contaminated with the impurities originating from their synthesis, handling and storage. It is therefore desirable to work with raw materials which are as pure as possible.

The polycarbonate synthesis is carried out continuously. The reaction in the phase interface (LPC method) may be carried out in pumped reactors, tube reactors or agitated tank cascades or combinations thereof, use of the aforementioned mixing members ensuring that aqueous and organic phases as far as possible do not demix until the synthesis mixture has reacted, i.e. no longer contains any saponifiable chlorine or phosgene or chloroformates.

The amount of chain stoppers to be used in the form of monophenols such as phenol, tert.-butylphenol or cumylphenol is from 0.5 mol. % to 10.0 mol. %, preferably 1.0 mol. % to 8.0 mol. %, particularly preferably 2.0 mol-% to 6.0 mol-%, expressed in terms of moles of diphenols respectively used. The addition of chain stoppers may take place before, during or after the phosgenation, preferably as a solution in a solvent mixture of methylene chloride and chlorobenzene (8-15 wt. % strength).

The catalysts used in phase interface synthesis are tert amines, in particular triethylamine, tributylamine, trioctylamine, N-ethylpiperidine, N-methylpiperidine, N-i/n-propylpiperidine, particularly preferably triethylamine and N-ethylpiperidine. The catalysts may be added to the synthesis individually, in a mixture or beside and following one another, and optionally before the phosgenation, although dosing after the phosgene introduction is preferable. The dosing of the catalyst or the catalysts may be carried out in substance, in an inert solvent, preferably that of the polycarbonate synthesis, or also as an aqueous solution, and then in the case of tert. amines as their ammonium salts with acids, preferably mineral acids, in particular hydrochloric acid. When using a plurality of catalysts or dosing fractions of the total amount of catalysts, different dosing methods may naturally also be carried out at different positions or at different times. The total amount of catalysts used lies between 0.001 and 10.000 mol % expressed in terms of moles of bisphenols used, preferably 0.01 and 8.00 mol %, particularly preferably 0.05 and 5.00 mol %.

The organic phase is washed repeatedly with deionised or distilled water. The separation of the organic phase, possibly dispersed with parts of the aqueous phase, after the individual washing steps is carried out by means of settling tanks, agitated tanks, or combinations of these measures, in which case the washing water may optionally be added between the washing steps by using active or passive mixing members.

The isolation of the polymer from the solution may be carried out by evaporating the solvent by means of temperature, a vacuum or a heated carrier gas.

The residues of the solvent may be removed from the highly concentrated polymer melts obtained in this way either directly from the melt by evaporation extruders, thin-layer evaporators, falling film evaporators, extrudate evaporators or by friction compacting, optionally with the addition of an entrainer such as nitrogen or carbon dioxide, or by using vacuum, and alternatively by subsequent crystallisation and heating out the residue of the solvent in the solid phase.

Reaction in the melt (melt polycondensation method, MPC method) may be discontinued after the transesterification method, or configured continuously. After the dihydroxyaryl compounds and diaryl carbonates are provided as a melt, optionally with further compounds, the reaction is started in the presence of a suitable catalyst. The yield, or the molecular weight, is increased with rising temperatures and falling pressures in suitable apparatus and devices by discharging the cleaved monohydroxyaryl compound until the desired final state is reached. Terminal groups are imposed in terms of type and concentration through the selection of the mixing ratio of dihydroxyaryl compound to diaryl carbonate, the loss rate of diaryl carbonate, dictated by the choice of procedure or plant for producing the polycarbonate, through the vapour and optionally added compounds, for example a high boiling point monohydroxyaryl compound.

The continuous method for producing polycarbonates is preferably characterised in that one or more dihydroxyaryl compounds with the diaryl carbonate, and optionally other added reactants, by using catalysts, are melted and after precondensation without separating the monohydroxyaryl compound being formed, in several subsequent reaction-evaporator stages with stepwise increasing temperatures and stepwise falling pressures, the molecular weight is reduced to the desired level.

The devices, apparatus and reactors suitable for the individual reaction-evaporator stages are, according to the procedure, heat exchangers, expansion apparatus, precipitators, columns, evaporators, agitated vessels and reactors or other commercially available apparatus, which provide the required residence time at selected temperatures and pressures. The selected devices must permit the required heat input and be designed so that they can accommodate the continuously increasing melt viscosities.

All the devices are connected to one another through pumps, pipelines and valves. The pipelines between all the instruments should of course be kept as short as possible, and the curvatures of the lines should be kept as small as possible, in order to avoid unnecessarily extended residence times. The outer, i.e. technical constraints and requirements for assemblies of chemical plants are in this case to be taken into account.

In order to carry out the method according to a preferred continuous procedure, either the reaction partners may be melted together or the solid dihydroxyaryl compound is dissolved in the diarylcarbonate melt or the solid diarylcarbonate is dissolved in the melt of the dihydroxyaryl compound, or the two raw materials are combined as a melt, preferably directly from production. The residence time of the separate melts of the raw materials, in particular that of the dihydroxyaryl compound, are set as short as possible.

The melt mixture, on the other hand, may reside longer at correspondingly lower temperatures without quality losses, owing to the melting point of the raw material mixture being reduced in comparison with the individual raw materials.

The catalyst, preferably phenol, is subsequently dissolved and added, and the melt is heated to the reaction temperature. For the technically important process for producing polycarbonate from 2,2-bis-(4-hydroxyphenyl)-propane and diphenyl carbonate, this is from 180 to 220° C., preferably 190 to 210° C., more particularly preferably 190° C. With residence times of from 15 to 90 min, preferably 30 to 60 min, reaction equilibrium is established without removing the hydroxyaryl compound being formed. The reaction may be carried out at atmospheric pressure, but for technical reasons also at a positive pressure. The preferred pressure in technical plants is from 2 to 15 bar absolute.

The melt mixture is expanded in a first vacuum chamber, the pressure of which is set at from 100 to 400 mbar, preferably 150 to 300 mbar, and then directly afterwards heated in a suitable device at the same pressure back to the inlet temperature. In the expansion process, the resulting hydroxyaryl compound is evaporated with monomers which are still present. After a residence time of from 5 to 30 min in a bottom product receiver, optionally with pumping, at the same pressure and same temperature the reaction mixture is expanded into a second vacuum chamber, the pressure of which is from 50 to 200 mbar, preferably from 80 to 150 mbar, and directly thereafter heated in a suitable device at the same pressure to a temperature of from 190 to 250° C., preferably from 210 to 240° C., particularly preferably from 210 to 230° C. Here again, the resulting hydroxyaryl compound is evaporated with monomers which are still present. After a residence time of from 5 to 30 min in a bottom product receiver, optionally with pumping, at the same pressure and same temperature the reaction mixture is expanded into a third vacuum chamber, the pressure of which is from 30 to 150 mbar, preferably from 50 to 120 mbar, and directly thereafter heated in a suitable device at the same pressure to a temperature of from 220 to 280° C., preferably from 240 to 270° C., particularly preferably from 240 to 260° C. Here again, the resulting hydroxyaryl compound is evaporated with monomers which are still present. After a residence time of from 5 to 20 min in a bottom product receiver, optionally with pumping, at the same pressure and same temperature the reaction mixture is expanded into a further vacuum chamber, the pressure of which is from 5 to 100 mbar, preferably from 15 to 100 mbar, particularly preferably from 20 to 80 mbar, and directly thereafter heated in a suitable device at the same pressure to a temperature of from 250 to 300° C., preferably from 260 to 290° C., particularly preferably from 260 to 280° C. Here again, the resulting hydroxyaryl compound is evaporated with monomers which are still present.

The number of these stages, here for example 4, may vary between 2 and 6. The temperatures and pressures are to be adapted accordingly when changing the number of stages, in order to obtain comparable results.

The relative viscosity of the precondensate of the oligomeric carbonate, as achieved in these stages, lies between 1.04 and 1.20, preferably between 1.05 and 1.15, particularly preferably between 1.06 and 1.10.

In a preferred embodiment, after a residence time of from 5 to 20 min in a bottom product receiver, optionally with pumping, at the same pressure and same temperature as in the last flash/evaporator stage, the oligocarbonate produced in this way is delivered into a disc or basket reactor and condensed out further at from 250 to 310° C., preferably 250 to 290° C., particularly preferably 250 to 280° C., at pressures of from 1 to 15 mbar, preferably from 2 to 10 mbar, with residence times of from 30 to 90 min, preferably 30 to 60 min. The product reaches a relative viscosity of from 1.12 to 1.28, preferably 1.13 to 1.26, particularly preferably 1.13 to 1.24. The melt leaving this reactor (medium-viscosity reactor) is brought to the desired final viscosity, or final molecular weight, by separating the condensation product phenol in a further disc or basket reactor (high-viscosity reactor). The temperatures for this are from 270 to 330° C., preferably 280 to 320° C., particularly preferably 280 to 310° C., and the pressure is from 0.01 to 3.00 mbar, preferably 0.2 to 2.0 mbar, with residence times of from 60 to 180 min, preferably 75 to 150 min. The rel. viscosities are adjusted to the level necessary for the intended application, and are from 1.18 to 1.40, preferably 1.18 to 1.36, particularly preferably 1.18 to 1.34.

The functions of the two basket reactors may also be combined in a single basket reactor.

The vapours from all the method stages are directly discharged, collected and processed. The processing is generally carried out by distillation, in order to achieve high purities of the products.

In the method of the present invention, the above-described phosphorus III and phosphorus V compounds, and optionally other additives, are introduced into the melts by side extruders in the extruder.

To this end, the compounds from the group which comprises Formulae (2), (4), and (6) and mixtures thereof are added as a pure substance or as a master batch (max. 10 wt %) to the polycarbonate before spinning (granulation) by means of a side unit (side extruder). This master batch may optionally contain further additives such as UV stabilisers, mould release agents or colouring additives.

Preferably, following the addition of the phosphorus compound(s), in a further step the amount of phosphorus compounds contained with oxidation states +3 and +5 according to Formulae (1)-(6) is determined, in which case the amount of phosphorus compounds contained with oxidation states +3 must be more than the amount of phosphorus compounds contained with oxidation states +5. If the amount of phosphorus compounds contained with oxidation states +3 is less than that of the phosphorus compounds with oxidation states +5, additional phosphorus compounds with oxidation states +3 will be added to the polycarbonate melt in a further step.

The introduction of additives serves to extend the useful life of the polycarbonate composition by stabilisers, which prevent breakdown of the composition constituents, to colour the end product, to simplify processing (for example mould release agents, flow assisters, antistatics) to adapt to the polymer properties to particular loads (impact strength modifiers such as rubbers; flameproofing agents, colorants, glass fibres).

These additives may be introduced into the polymer melt individually or in any mixtures or a plurality of different mixtures, and before isolation of the polymers or alternatively after melting granules in a so-called compounding step. The additives, or mixtures thereof, may be introduced into the polymer melt as a solid, i.e. as a powder, or as a melt. Another type of dosing involves the use of master batches or mixtures of master batches of the additives or additive mixtures.

Suitable conventional additives for polycarbonate composition are described, for example, in "Additives for Plastics Handbook, John Murphy, Elsevier, Oxford 1999", in "Plastics Additives Handbook, Hans Zweifel, Hanser, Munich 2001" or in WO 99/55772, pp. 15-25.

Colorants, such as organic dyes or pigments or inorganic pigments, IR absorbers may furthermore be added individually, as a mixture or in combination with stabilisers, (hollow) glass spheres, inorganic fillers or organic and inorganic scattering pigments.

The polycarbonate compositions according to the invention may be processed on conventional machines, for example on extruders or injection moulding machines, to form any desired shaped bodies, shaped parts, sheets or plates or bottles in the conventional way.

The polycarbonate compositions obtainable in this way, with improved optical properties according to the present invention, may be used to produce extrudates (plates, sheets and laminates thereof; for example for card applications and tubes) and shaped bodies (bottles), in particular those for use in the transparent field, particularly in the field of optical applications such as for example plates, web plates, glazing, scattering and cover disks, lamp coverings, plastic cover disks, lightguide elements or optical data storage, for example audio-CD, CD-R(W), DVD, DVD-R(W), minidiscs in their various read-only or write-once and optionally rewritable embodiments, as well as data media for near-field optics. Also for the production of articles for the electrical/electronics and IT sectors.

Another large field of use of the polycarbonate compositions according to the invention involves scattering discs and other display applications, but also optical applications in the automotive sector, for example glazing, plastic coverings, scattering discs or lightguide elements, collimators, lenses, LED applications, polymer lightguide fibres, diffusor sheets for background lighting and lamp coverings for long-field lamps.

The polycarbonate compositions of the present invention may also be used to produce compounds, blends such as for example wie PC/ABS, PCASA, PC./SAN, PC/PBT, PC/PET or PC/PETG, and components which place particular requirements on optical and mechanical properties, for example LED applications, collimators, light-emitting diodes, lamp coverings, the automotive sector, for instance front headlights and glazing, the medical field, for instance dialysers, connectors, taps, packaging such as bottles, containers.

The present application also relates to the extrudates and shaped bodies or shaped parts made of the polymers according to the invention.

EXAMPLES

Raw Materials Used:

PC 1 is a polycarbonate based on Bisphenol A and phosgene with a melt volume flow rate (MVR) of 14.5 cm³/10 min (260° C./2.16 kg).

PC 2 is a polycarbonate based on Bisphenol A and phosgene with an MVR of 15.7 cm³/10 min (260° C./2.16 kg).

PC 3 is a polycarbonate based on Bisphenol A and phosgene with an MVR of 15.5 cm³/10 min (260° C./2.16 kg).

PC 4 is a polycarbonate based on Bisphenol A and phosgene with an MVR of 8.9 cm³/10 min (260° C./2.16 kg).

TPP: Triphenylphosphine

Irgafos 168: Phosphite from the company BASF/Ciba (tris-(2,4-di-tert.-butyl)phenyl-phosphite)

Characterisation of the Moulding Compositions According to the Invention (Test Methods):

Colour Measurement:

Determination of yellowness index YI on shaped bodies by measurement on standard test bodies (4 mm thick) according to ASTM E313.

Determination of the transmission on shaped bodies by measurement on standard test bodies (4 mm thick) according to ASTM E313.

The determination of the melt volume flow rate (MVR) is carried out at 300° C. and with a 1.2 kg load, or at 260° C. with a 2.16 kg load using a melt index test device according to ISO 1133.

The determination of the I-MVR is carried out similarly as described above (ISO 1133), but only after a continuous thermal load for 20 minutes.

Tab. 1 shows the inventive effect of the improved optical properties, especially the increased transmission and the reduced yellowness index at an increased processing temperature.

As revealed clearly by Table 1, the composition according to the invention has a much better thermal stability relative to unsubstituted polycarbonate compositions. The Y.I. drops significantly, whereas the transmission and melt flow behaviour remain virtually unchanged, this effect being particularly pronounced with high processing temperatures and long residence times.

The tests in Table 2 showed that direct incorporation of the phosphorus compounds according to the invention is essential when producing the polycarbonates (PC 5 and PC 6), whereas the absence of the pair of phosphorus compounds with oxidation states +3 and +5 in the polycarbonate composition leads to a much higher Y.I. and a lower transmission.

PC 5, according to the invention, is a BPA polycarbonate with an MVR of 10.0 cm³/10 min (1.2 kg, 300° C. according to ISO 1133)

PC 6, according to the invention, is a BPA polycarbonate with an MVR of 13.2 cm³/10 min (1.2 kg, 300° C. according to ISO 1133)

The comparative example PC 7 is a BPA polycarbonate with an MVR of 13.0 cm³/10 min (1.2 kg, 300° C. according to ISO 1133)

TABLE 2

|  |  | PC 5 according to the invention | PC6 according to the invention | PC 7 comparison 2 |
|---|---|---|---|---|
| TPP content | ppm | 191 |  |  |
| TPPO content | ppm | 27 |  |  |
| Irgafos 168 content | ppm |  | 129 |  |
| Irgafos 168 oxide content | ppm |  | 6 |  |
| Transmission @ 4 mm | % | 89.74 | 89.79 | 89.36 |
| YI |  | 1.24 | 1.36 | 1.75 |

| Results: |  | Comparison 1 | PC 1 | PC 2 | PC 3 | PC 4 |
|---|---|---|---|---|---|---|
| TPP content | ppm | — | 168 | 321 | 310 | 192 |
| TPPO content | ppm | — | 32 | 26 | 55 | 23 |
| MVR 260° C. (2.16 kg) | ml/10 min | 13.2 | 14.5 | 15.7 | 15.5 | 8.9 |
| IMVR20' 260° C. (2.16 kg) | ml/10 min | 13.3 | 13.9 | 15.0 | 15.0 | 8.8 |
| Delta MVR/IMVR20' |  | 0.1 | −0.6 | −0.7 | −0.5 | −0.1 |
| opt. Data 280° C./80° C. |  |  |  |  |  |  |
| Transmission | % |  | 89.97 | 90.02 | 89.96 | 90.0 | 90.0 |
| Y.I. |  |  | 1.19 | 0.91 | 1 | 0.9 | 0.9 |
| opt. Data 300° C./80° C. |  |  |  |  |  |  |
| Transmission | % | 90 | 89.99 | 89.99 | 90 | — |
| Y.I. |  | 1.17 | 0.96 | 0.44 | 0.9 | — |
| opt. Data 320° C./80° C. |  |  |  |  |  |  |
| Transmission | % | 89.98 | 90.03 | 89.96 | 89.9 | — |
| Y.I. |  | 1.28 | 0.98 | 1.02 | 1.0 | — |
| opt. Data 320° C./80° C. 5-times residence time |  |  |  |  |  |  |
| Transmission | % | 89.94 | 90.01 | 89.92 | 89.9 | — |
| Y.I. |  | 1.37 | 1.1 | 1.05 | 1.1 | — |
| opt. Data 340° C./80° C. |  |  |  |  |  |  |
| Transmission | % | 89.84 | 89.93 | 89.79 | 89.8 | — |
| Y.I. |  | 1.72 | 1.25 | 1.18 | 1.1 | — |
| opt. Data 340° C./80° C. 5-times residence time |  |  |  |  |  |  |
| Transmission | % | 89.83 | 89.89 | 89.7 | 89.7 | — |
| Y.I. |  | 1.69 | 1.48 | 1.53 | 1.3 | — |

It can be seen that the polycarbonate compositions PC 5 and PC 6 according to the invention have a much higher transmission together with a reduced yellowness index.

The tests in Table 3 showed that direct incorporation of the phosphorus compounds according to the invention is essential when producing the polycarbonates (PC 5), whereas subsequent compounding of the phosphine/phosphine oxide mixture leads to compositions with a much higher Y.I. and a lower transmission.

PC 8, according to the invention, is a BPA polycarbonate with an MVR of 12.5 cm$^3$/10 min (1.2 kg, 300° C. according to ISO 1133)

The comparative example PC 9 is a BPA polycarbonate with an MVR of 12.5 cm$^3$/10 min (1.2 kg, 300° C. according to ISO 1133), in which 250 ppm of TPP were incorporated in a compounding step.

TABLE 3

| Results | | PC 8 according to the invention | PC9 comparison 3 |
|---|---|---|---|
| TPP content | ppm | 190 | 41 |
| TPPO content | ppm | 27 | 84 |
| Transmission @ 4 mm | % | 89.81 | 89.05 |
| YI | — | 1.29 | 1.48 |

It can be seen that the polycarbonate composition PC 8 according to the invention has a much higher transmission together with a reduced yellowness index, compared with the subsequently compounded PC 9.

The invention claimed is:

1. A composition comprising a polycarbonate or copolycarbonate which comprises bisphenol-A and at least one pair of a phosphorus compound having the oxidation number +3 and a phosphorus compound having the oxidation number +5 according to one of formulae (1) through (6)

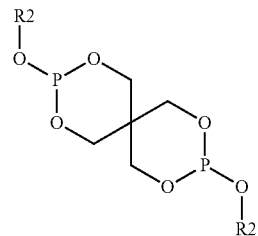
(1)

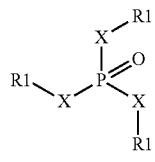
(2)

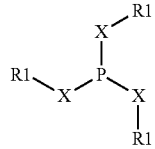
(3)

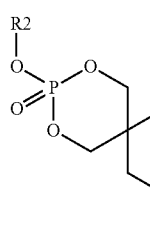
(4)

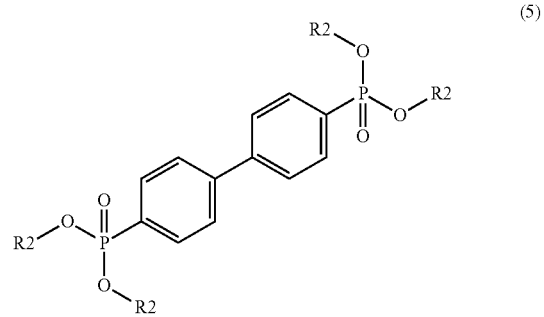
(5)

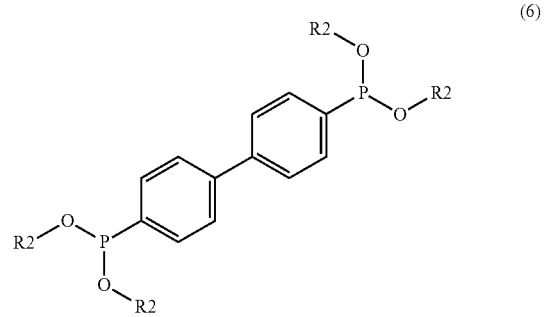
(6)

wherein
X is a single chemical bond or an oxygen atom, and
R1 and R2
are independently of one another and among one another a phenyl radical or a substituted phenyl radical, the phosphorus compound having the oxidation state +5 in a pair respectively corresponding to the oxidised form of the phosphorus compound having the oxidation state +3 and the amount of more highly oxidised compound contained being less than that of the compound with the lower oxidation number.

2. The composition of claim 1, wherein the compound pair of the phosphorus compounds is selected from the group consisting of compounds according to formulae (7) through (28)

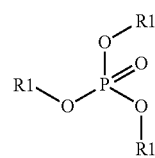
(7)

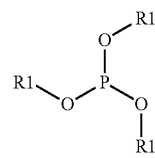
(8)

(9)
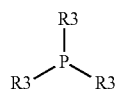
(10)
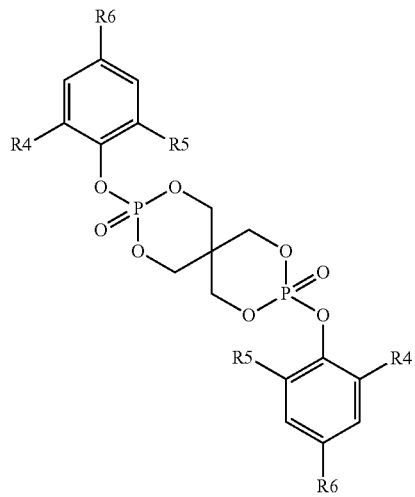
(11)
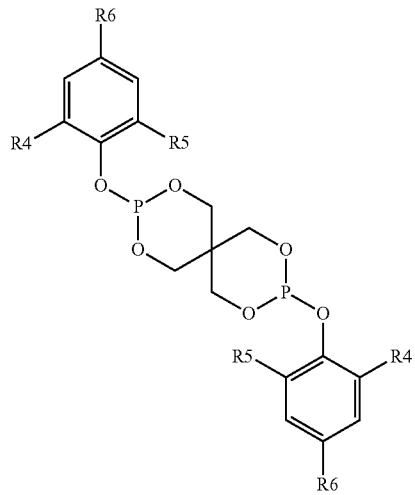
(12)
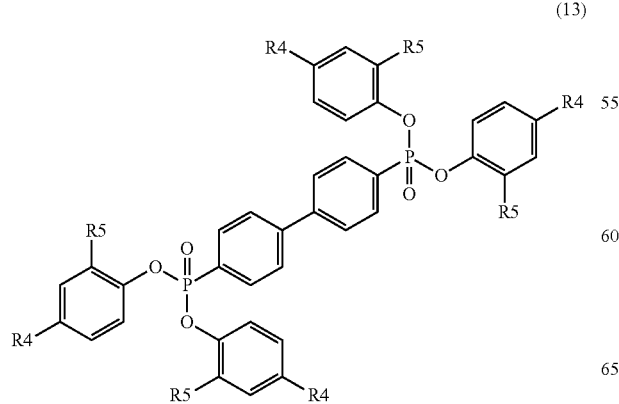
(13)
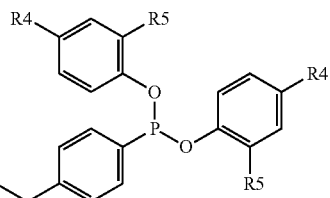
(14)
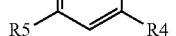
(15)
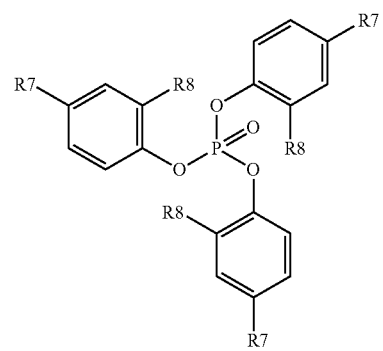
(15)
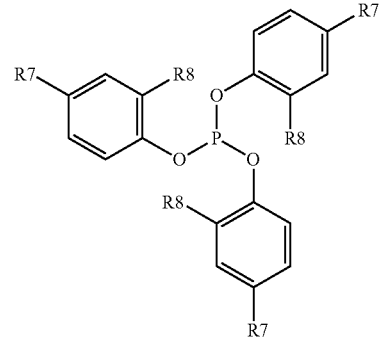
(16)
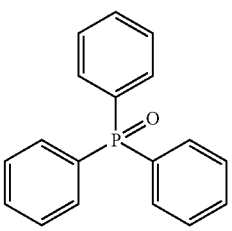
(17)
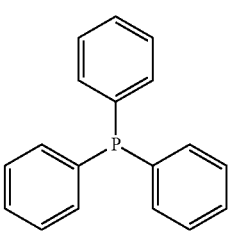
(18)

(19)
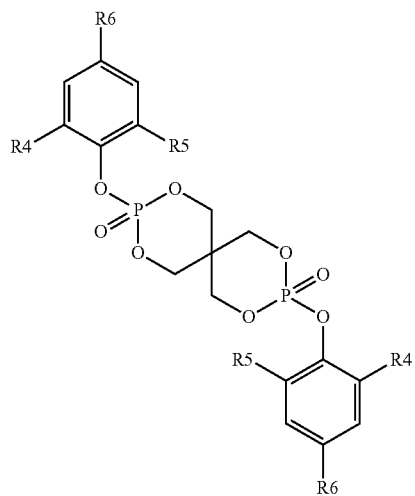
(20)
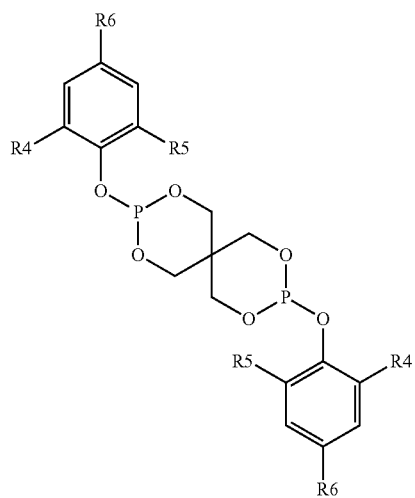
(21)
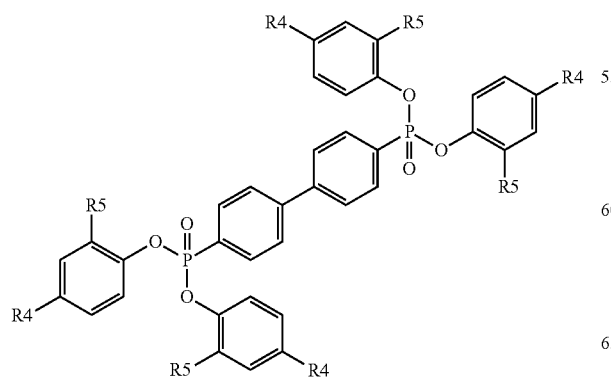
(22)
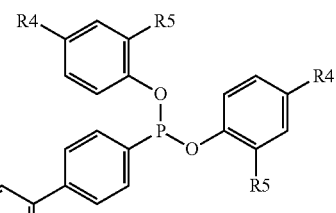
(23)
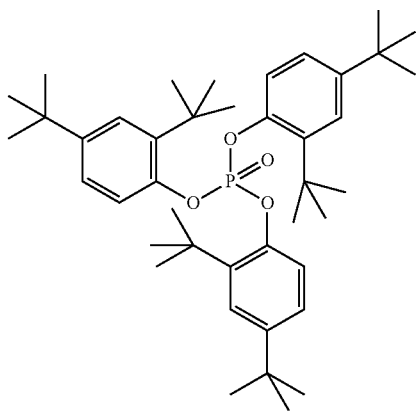
(24)
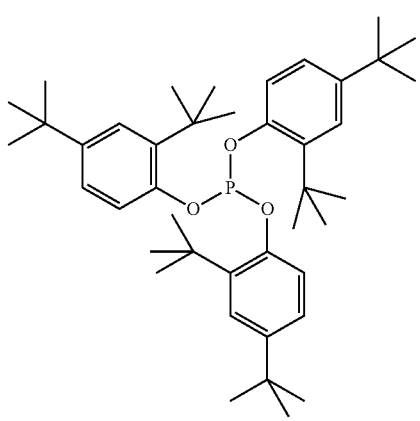
(25)
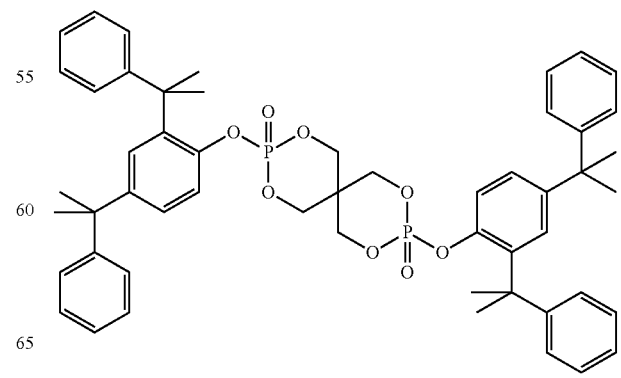

-continued

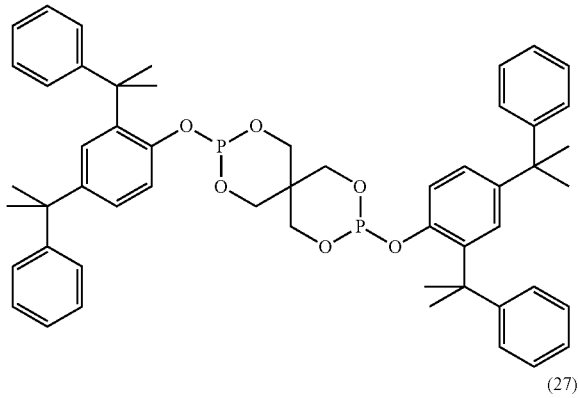

(26)

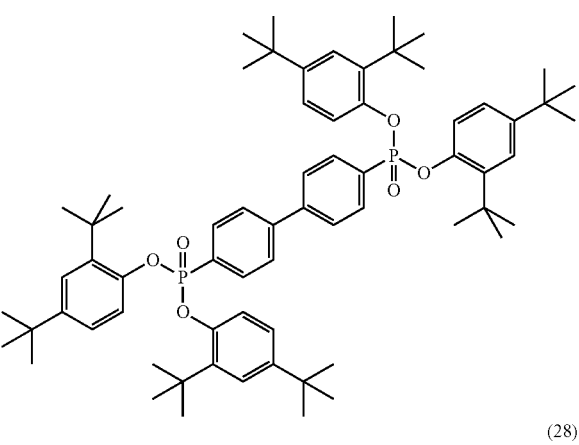

(27)

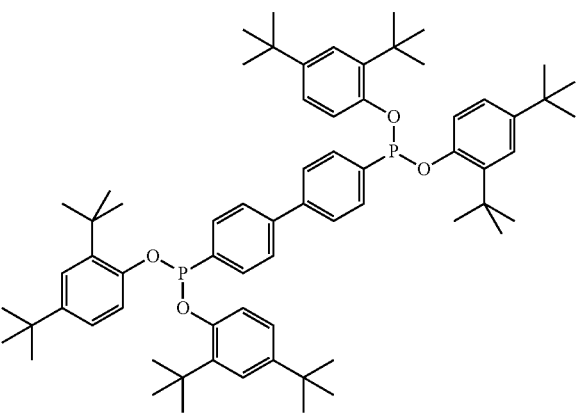

(28)

wherein
R1 and R3
  independently of one another are a phenyl radical or a substituted phenyl radical, and
R4, R5, R6, R7, and R8 are H, branched $C_1$-$C_8$ alkyl, or cumyl.

3. The composition of claim 1, wherein the amount of phosphorus compounds with the oxidation state +3 contained in the compound pair in the composition is from 5 to 1500 ppm.

4. The composition of claim 1, wherein the amount of phosphorus compounds with the oxidation state +3 contained in the compound pair in the composition is from 100 to 325 ppm.

5. The composition of claim 1, wherein the amount of phosphorus compounds with the oxidation state +5 contained in the compound pair in the composition is from 5 to 300 ppm.

6. The composition of claim 1, wherein the amount of phosphorus compounds with the oxidation state +5 contained in the compound pair in the composition is from 20 to 60 ppm.

7. The composition of claim 1, wherein the compound pair contains from 2% to 49% of phosphorus compounds with the oxygen state +5, expressed in terms of the total mass of the compounds of Formulae (1) through (6).

8. The composition of claim 1, wherein the ratio of secondary to primary antioxidants lies between 6:1 and 1:6.

9. The composition of claim 1, wherein it contains at least one additive selected from the group consisting of UV stabilisers, mould release agents and colorants.

10. The composition of claim 1, wherein the UV absorber is selected from the group consisting of benzotriazole, triazine, cyanacrylate or malonic ester.

11. The composition of claim 1, wherein the polycarbonate has a molecular weight Mw of from 10,000 to 200,000.

12. A process for producing the composition of claim 1, comprising the step of a) producing a polycarbonate composition from a base resin obtained in a continuous method according to the phase interface method or melt method, and introducing a phosphorus compound having the oxidation state +3 of Formula (2), (4) or (6) in a continuous process by means of a side unit with the production of a corresponding phosphorus compound having the oxidation state +5 of Formula (1), (3) or (5) in an in situ reaction inside the production unit, optionally with the exclusion of air.

13. A blend or compound comprising the composition of claim 1.

14. The process of claim 12, wherein said process further comprises the steps of:
  b) determining the amount of phosphorus compounds having the oxidation states +3 and +5 contained according to Formulae (1)-(6),
  c) optionally adding additional phosphorus compounds having the oxidation +3 to the polycarbonate melt.

15. An extrudate or shaped body comprising the composition of claim 1.

16. The composition of claim 1, wherein the at least one pair of a phosphorus compound having the oxidation number +3 and a phosphorus compound having the oxidation number +5 are of the formula (1) and (2).

17. The composition of claim 1, wherein the at least one pair of a phosphorus compound having the oxidation number +3 and a phosphorus compound having the oxidation number +5 are of the formula (3) and (4).

18. The composition of claim 1, wherein the at least one pair of a phosphorus compound having the oxidation number +3 and a phosphorus compound having the oxidation number +5 are of the formula (5) and (6).

* * * * *